(12) United States Patent
Fisher

(10) Patent No.: US 10,082,177 B2
(45) Date of Patent: Sep. 25, 2018

(54) SLIDING ENGINE COMPONENT

(71) Applicants:Mahle International GmbH, Stuttgart (DE); Mahle Engine Systems UK Limited, Warwickshire (GB)

(72) Inventor: Nathan Fisher, Birmingham (GB)

(73) Assignees: Mahle Engine Systems UK Ltd (GB); Mahle International GmbH (DE)

( * ) Notice: Subject to any disclaimer, the term of this patent is extended or adjusted under 35 U.S.C. 154(b) by 31 days.

(21) Appl. No.: 15/036,812

(22) PCT Filed: Nov. 13, 2014

(86) PCT No.: PCT/EP2014/074423
§ 371 (c)(1),
(2) Date: May 15, 2016

(87) PCT Pub. No.: WO2015/071339
PCT Pub. Date: May 21, 2015

(65) Prior Publication Data
US 2016/0273582 A1    Sep. 22, 2016

(30) Foreign Application Priority Data

Nov. 15, 2013 (GB) .................................. 1320188.4

(51) Int. Cl.
| | |
|---|---|
| *F16C 33/20* | (2006.01) |
| *F16C 9/04* | (2006.01) |
| *F16C 9/02* | (2006.01) |
| *B05D 7/00* | (2006.01) |

(52) U.S. Cl.
CPC ............ *F16C 33/203* (2013.01); *B05D 7/536* (2013.01); *F16C 9/02* (2013.01); *F16C 9/04* (2013.01);
(Continued)

(58) Field of Classification Search
CPC .. F16C 33/203; F16C 9/02; F16C 9/04; F16C 33/201; F16C 33/208; F16C 2208/22; F16C 2208/80; F16C 2360/22; B21D 53/10; B05D 5/08; B05D 7/532; B05D 7/536;
(Continued)

(56) References Cited

U.S. PATENT DOCUMENTS 2,865,692 A * 12/1958 Gossmann ............... F16C 33/20
                                                              384/298
3,471,207 A * 10/1969 McCloskey ........... F16C 33/201
                                                              216/34
(Continued)

FOREIGN PATENT DOCUMENTS

GB          1203081 A      8/1970

OTHER PUBLICATIONS

GB Search Report for GB1320188.4, dated Jun. 24, 2014.

*Primary Examiner* — Marcus Charles
(74) *Attorney, Agent, or Firm* — Fishman Stewart PLLC

(57) ABSTRACT

A sliding engine component may include a sliding surface including a plastic polymer-based layer disposed on a metallic substrate. The plastics polymer-based layer may include a plurality of plastic polymer-based layers. The plurality of plastic polymer-based layers may include a first coating of a first polymer-based layer deposited on the metallic substrate and cured at a first temperature, and a second coating of a second polymer-based layer deposited onto the first polymer-based layer and cured at a second temperature. The second temperature may be lower than the first temperature.

18 Claims, 2 Drawing Sheets

(52) U.S. Cl.
CPC .......... *F16C 33/201* (2013.01); *F16C 33/208* (2013.01); *B05D 2201/02* (2013.01); *F16C 2208/22* (2013.01); *F16C 2208/80* (2013.01); *F16C 2360/22* (2013.01); *Y10T 29/49705* (2015.01); *Y10T 29/49707* (2015.01)

(58) Field of Classification Search
CPC ................. B05D 2202/01; B05D 7/50; Y10T 29/49647; Y10T 29/49655; Y10T 29/49705; Y10T 29/4971; Y10T 29/49707
USPC ........ 384/129, 276, 297–298, 261–261, 270, 384/280, 282; 428/339, 349, 354, 363, 428/402; 508/100; 29/898.54, 29/898.58–898.59
See application file for complete search history.

(56) References Cited

U.S. PATENT DOCUMENTS

| | | | | |
|---|---|---|---|---|
| 4,577,379 | A * | 3/1986 | Kramer | B63H 23/326 29/898.055 |
| 4,663,810 | A * | 5/1987 | Kramer | B63H 23/326 264/258 |
| 4,674,164 | A * | 6/1987 | McCloskey | F16C 33/18 29/441.1 |
| 5,215,823 | A * | 6/1993 | Itoh | C23C 14/0605 148/317 |
| 7,942,581 | B2 * | 5/2011 | Leonardelli | B05D 5/08 384/129 |
| 2003/0185474 | A1 * | 10/2003 | Tanaka | F16C 33/201 384/297 |
| 2003/0207118 | A1 * | 11/2003 | Fukushi | B32B 7/12 428/421 |
| 2004/0008914 | A1 | 1/2004 | Hiramatsu et al. | |
| 2006/0029795 | A1 * | 2/2006 | Sawyer | B32B 5/14 428/339 |
| 2007/0225177 | A1 * | 9/2007 | Murase | C10M 103/00 508/104 |
| 2011/0262064 | A1 * | 10/2011 | Burgeff | F16C 27/063 384/220 |
| 2011/0268944 | A1 | 11/2011 | Adam et al. | |
| 2014/0010484 | A1 * | 1/2014 | Schmitjes | F16C 33/04 384/42 |

* cited by examiner

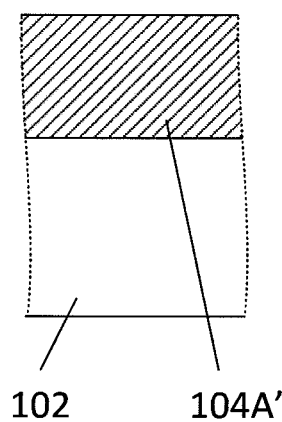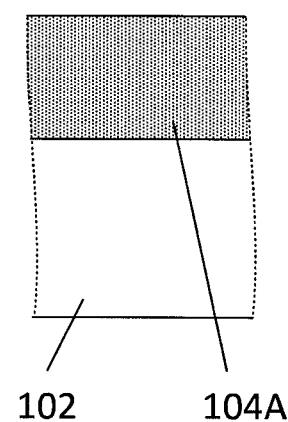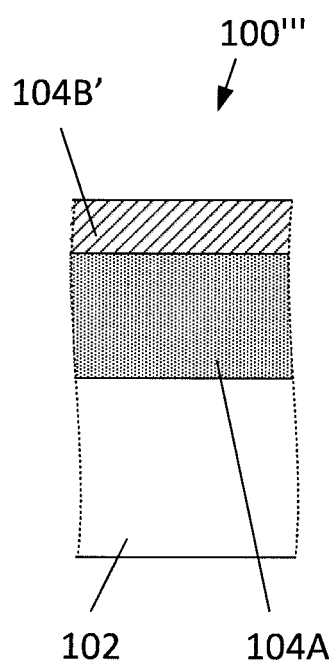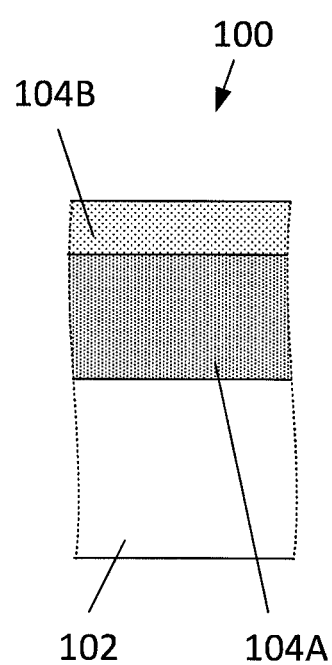

SLIDING ENGINE COMPONENT

CROSS-REFERENCE TO RELATED APPLICATIONS

This application claims priority to British Patent Application No. 1320188.4, filed Nov. 15, 2013, and International Patent Application No. PCT/EP2014/074423, filed Nov. 13, 2014, both of which are hereby incorporated by reference in their entirety.

TECHNICAL FIELD

The present invention relates to sliding engine components having a plastic polymer-based bearing "overlay" layer, and in particular to sliding engine components for sliding bearing assemblies such as bearing lining shells, bushes, bearing surfaces of crankshafts, bearing surfaces of camshafts, bearing surfaces of connecting rods, thrust washers, flanges, bearing surfaces of a bearing block, bearing surfaces of a bearing cap, and piston assembly components such as piston rings, piston skirts, and cylinder walls and cylinder liners.

BACKGROUND

In internal combustion engines, the bearing assemblies typically each comprise a pair of half bearings retaining a crankshaft that is rotatable about an axis. Each half bearing is a hollow generally semi-cylindrical bearing shell, and typically at least one is a flange half bearing, in which the bearing shell is provided with a generally semi-annular thrust washer extending outwardly (radially) at each axial end. In other bearing assemblies it is also known to use an annular or circular thrust washer.

The bearing surfaces of bearing shells generally have a layered construction, in which a strong backing material is coated with one or more layers having preferred tribological properties to provide a bearing surface that faces a cooperating moving part, a crankshaft journal, in use. Known bearing shells have a substrate comprising a backing, which is coated with a lining layer, which is in turn coated with an overlay layer.

The strong backing material may be steel, having a thickness of about 1 mm or more.

A known lining layer may be a copper-based material (e.g. copper-tin bronze) or an aluminium-based material (e.g. aluminium or aluminium-tin alloy), which is adhered to the substrate (either directly to the backing or to an optional interlayer). The thickness of the lining layer is generally in the range from about 0.05 to 0.5 mm (e.g. 300 μm of copper-based alloy of 8% wt Sn, 1% wt Ni, and balance of Cu, apart from incidentally impurities).

The overlay layer may be 6 to 25 μm of a plastic polymer-based composite layer or a metal alloy layer (e.g. a tin-based alloy overlay).

For example, WO2010066396 describes a plastic polymer-based composite material for use as an overlay layer on a copper- or aluminium-based lining layer, which is in turn bonded onto a steel backing. The described overlay layer comprises a matrix of a polyimide/amide plastic polymer material, having distributed throughout the matrix: from 5 to less than 15% vol of a metal powder; from 1 to 15% vol of a fluoropolymer particulate, the balance being the polyimide/amide resin apart from incidental impurities (e.g. a layer of 12 μm thickness that comprises 12.5% vol Al, 5.7% vol PTFE particulate, 4.8% vol silane, <0.1% vol other components, and balance (approximately 77% vol) polyimide/amide).

Such plastic polymer-based overlay layers may be deposited by various different methods, including spraying, pad printing (an indirect offset printing process, e.g. in which a silicone pad transfers a layer of the plastic polymer composite material onto the sliding bearing substrate), screen printing, or by a transfer rolling process. Prior to deposition, the plastic polymer is in solution in a solvent, and the solid particulate is suspended in the solution.

After the deposition of the overlay layer has been completed, the entire polymer layer is thermally cured by heating to set the polymer-based layer, by inducing cross-linking of the polymer matrix. For example the overlay layer may be cured at 140 to 240° C. for a duration that may range from a few minutes to a few hours (e.g. 10 minutes to 2 hours). Different curing temperatures may be used when the polymer has been deposited on different metallic substrates. For example: for polymer deposited directly onto a steel backing without a lining layer, or where a copper-based lining layer is provided on the backing, the metallic substrate is able to withstand high temperature curing of the polymer; in contrast, where an aluminium-tin lining layer is used on the backing, lower temperature curing may be used, to avoid migration of the tin to crystal boundaries of the lining layer.

A particular challenge to the performance of bearing lining layers and/or overlay layers is provided by the fuel-saving configuration of vehicle engines to "stop-start" operation, in which the engine is stopped and requires restarting each time the vehicle stops, in contrast to conventional engine operation, in which the engine is kept running throughout a vehicle's journey. Engines configured for stop-start operation may restart their engines about one hundred times more frequently than conventionally configured engines, which are run continuously throughout each vehicle journey. Engine bearings are conventionally hydrodynamically lubricated, with little or no lubrication initially being provided to the bearings when the engine starts. Accordingly, stop-start operating of an engine can place increased demands upon the performance of the bearings.

SUMMARY

According to a first aspect, there is provided a sliding engine component having a sliding surface provided by a plastic polymer-based layer on a metallic substrate, wherein the plastic polymer-based layer comprises a plurality of plastic polymer-based layers, and is obtainable by the process of: depositing a first coating of a first polymer-based layer; curing the first polymer-based layer at a first temperature; depositing a second coating of a second polymer-based layer; and curing the second polymer-based layer at a second temperature that is lower than the first temperature.

According to a second aspect, there is provided a sliding engine component having a plastic polymer-based layer on a metallic substrate, the polymer-based layer comprising: a first polymer-based layer deposited onto the metallic substrate and cured at a first temperature; and a second polymer-based layer deposited onto the first polymer-based layer and cured at a second temperature that is lower than the first temperature.

According to a third aspect, there is provided an engine comprising a sliding engine component according to the first or second aspect.

According to a fourth aspect, there is provided a method of manufacturing a sliding engine component having a sliding surface provided by a plastic polymer-based layer on a metallic substrate, the method comprising: depositing a first coating of a first polymer-based layer; curing the first polymer-based layer at a first temperature; depositing a second coating of a second polymer-based layer; and curing the second polymer-based layer at a second temperature that is lower than the first temperature.

The first polymer-based layer may be cured at a temperature in the range of 190 to 240° C.

The second polymer-based layer may be cured at a temperature in the range of 120 to 180° C.

The plurality of plastic polymer-based layers may comprise the first and second polymer-based layers and one or more intervening polymer-based layers, and may be obtainable by the process of:
  depositing a corresponding plurality of successive coatings, and
  curing the corresponding plurality of coatings at successively decreasing temperatures after the provision of each coating and before the provision of any subsequent coating.

The cured polymer-based layers may be composite layers of a plastic polymer matrix with particulate distributed throughout the matrix.

The provided polymer-based layers may have the same composition.

A polymer-based layer may be cured by a process selected from the group consisting of: heating in an oven, infrared radiation, and ultraviolet radiation.

The sliding engine component may be a sliding bearing assembly component selected from the group consisting of bearing lining shells, bushes, bearing surfaces of crankshafts, bearing surfaces of camshafts, bearing surfaces of connecting rods, thrust washers, bearing surfaces of a bearing block, and bearing surfaces of a bearing cap.

BRIEF DESCRIPTION OF THE DRAWINGS

Embodiments of the invention are further described hereinafter with reference to the accompanying drawings, in which:

FIGS. 1B, 1C, 1D and 1E show cross-sectional views through part of the bearing shell of FIG. 1A at different stages in its manufacture.

DETAILED DESCRIPTION

In the described embodiments, like features have been identified with like numerals, albeit in some cases having one or more of: increments of integer multiples of 100; suffix letters and typographical marks (e.g. primes). For example, in different figures, 100, 200 and 300 have been used to indicate a bearing shell, and 100, 100', 100" and 100'" have been used to indicate a bearing shell in different stages of manufacture.

Figure 1A:
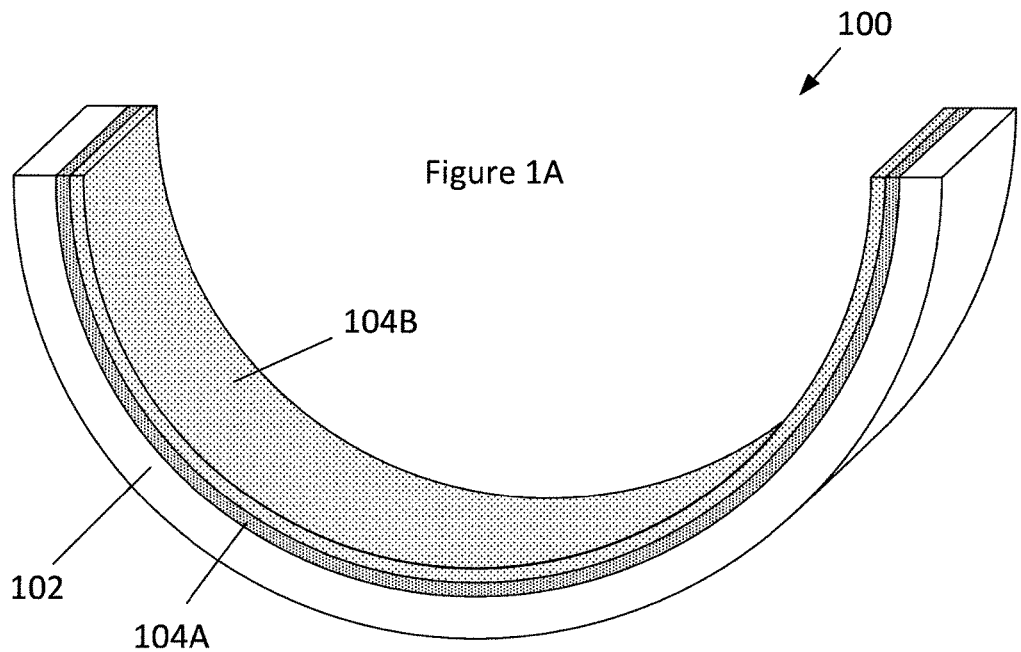
FIG. 1A shows a bearings shell, which is an embodiment of a sliding engine component according to the present invention.

FIG. 1A schematically illustrates a bearing shell 100 (e.g. an exemplary sliding engine component) in the form of a hollow semi-cylindrical bearing lining shell, which is also commonly referred to as a "half bearing".

The half bearing 100 has a substrate comprising a strong steel backing 102, and two plastic-polymer based layers 104A and 104B. The plastic polymer-based layer 104A closer to the substrate 102 provides a lining layer, and the plastic polymer-based layer 104B further from the substrate provides an overlay layer.

The backing 102 provides strength and resistance to deformation of the bearing shell 100, when it is assembled in a main bearing housing or in a connecting rod big end, for example.

Both the plastic polymer-based lining layer 104A and the overlay layer 104B are composite layers of a plastic polymer matrix with particulate distributed throughout the matrix. The composite plastic polymer-based layers are deposited as a mixture of a plastic polymer-based matrix material and suspended particulate, typically also comprising solvent, which facilitates forming and depositing the mixture. The layers may each have a thickness of 2 to 10 μm. Each of the lining layer 104A and the overlay layer 104B may be built up as a succession of sub-layers.

After deposition, each of the polymer-based layers is cured to provide its functional properties. Thermal curing stages may be provided by baking the bearing shell in an oven or irradiating the half bearing with infrared radiation. Alternatively, the later deposited plastic polymer-based material may be cured by exposure to ultraviolet light, e.g. without significant heating above ambient.

The overlay layer 104B is configured to provide a running surface (i.e. sliding surface) over the lifetime of the vehicle containing the bearing shell 100, facing a cooperating moving part in a bearing assembly. In use, the overlay layer 104B of the bearing shell 100 receives a journaled shaft in an assembled bearing, which mutually cooperate, with an intervening film of lubricating oil. The overlay layer 104B is particularly suited to accommodate small misalignments between the bearing surface and the shaft journal (conformability) and is able to receive and embed dirt particles circulating in the lubricating oil supply, so as to prevent scoring or damage to the journal surface by the debris (dirt embedability).

The lining layer 104A provides suitable bearing running properties, if the overlay layer 104B should become worn through, for any reason. Accordingly, the material of the lining layer 104A provides seizure resistance and compatibility, and the lining layer is harder than the material of the overlay layer 104B, to prevent the shaft journal from wearing through the overlay layer and contacting the shaft and the backing, which could prove particularly damaging to the bearing assembly, since the backing has low seizure resistance and compatibility.

During manufacture, the lining layer 104A and the overlay layer 104B are subjected to different curing regimes, to produce their different physical properties (i.e. different hardnesses, and so different wear resistances). In particular, the lining layer 104A, which is deposited onto the substrate 102, is subject to a first cure at a higher temperature T1 before the overlay layer 104B is deposited, following which both the lining and overlay layers are subject to a second cure, at a lower temperature T2. Plastic polymer matrix materials that may be cured (i.e. by inducing molecular cross-linking of the plastic polymer matrix) at temperatures in the range 120 to 320° C., are particularly suitable for use in sliding engine components (e.g. half bearings) and at their typical operating temperatures in combustion engines. For example, suitable lining layer and overlay layer properties may be provided by a first curing step in the range 120 to 180° C. and a second curing step in the range 190 to 240° C., each for a duration of 10 minutes to 4 hours.

FIGS. 1B to 1E illustrate an exemplary process by which the bearing shell 100 of FIG. 1A is formed, showing cross-sectional views through part of the bearing shell of FIG. 1A at different stages in its manufacture. FIG. 1B shows the half bearing 100' after the uncured plastic polymer-based lining layer 104A' has been deposited onto the backing 102 as a mixture of the uncured plastic polymer-based matrix material with suspended particulate (and typically some residual solvent), in a first deposition stage. After the uncured lining layer 104A' has been deposited, it is cured at 240° C. (T1) for 2 hours in a first curing stage to form the cured lining layer 104A, as shown in FIG. 1C. FIG. 1D shows the half bearing 100''' after the uncured plastic polymer-based overlay layer 104B' has been deposited onto the cured lining layer 104A as a mixture of the uncured plastic polymer-based matrix material with suspended particulate (and typically some low-level residual solvent), in a second deposition stage. The uncured plastic polymer-based overlay layer 104B' has the same composition as the uncured plastic polymer-based lining layer 104A'. After the uncured overlay layer 104B' has been deposited, both plastic polymer-based layers are cured at a lower temperature of 180° C. (T2) for 2 hours in a second curing stage, to form the cured overlay layer 104B, as shown in FIG. 1E. Although primarily concerned with curing the overlay layer 104B, the second curing stage may additionally provide a slight increase in the curing of the underlying lining layer 104A. The curing stages will also remove substantially all of any residual solvent.

The composite plastic polymer-based layer having plastic polymer-based layers cured at different temperatures provides the combined performance advantages of (i) enhanced seizure and scuff resistance under boundary lubrication conditions, if hydrodynamic lubrication of the bearing assembly should breakdown, and (ii) enhanced load carrying capacity under hydrodynamic lubrication conditions. The lower temperature cured overlay layer provides enhanced resistance to seizure and scuffing compared with an equivalent layer cured at a higher temperature, e.g. in the case that the matrix material is a polyamide/imide matrix, the 180° C. cured plastic polymer-based layer provides seizure resistance for loads that are at least 50% higher than an equivalent layer cured at 240° C. The higher temperature cured lining layer provides enhanced load carrying capacity (LCC), if the lining layer should become exposed through the overlay layer being worn through, compared with an equivalent layer cured at a lower temperature, e.g. in the case that the matrix material is a polyamide/imide matrix material, the 240° C. cured plastic polymer-based layer provides a load carrying capacity of 85 MPa<LCC(240° C.)<95 MPa, compared with an equivalent layer cured at 180° C. that provides a load carrying capacity of 75 MPa<LCC(180° C.)<85 MPa (the exemplary pressures relate to the mean average pressure across axial length of the bearing shell at maximum load).

Advantageously, the sliding bearing the lining and overlay layers can be formed by the same deposition processes, which simplifies the manufacturing process.

Providing the different physical properties by curing the plastic polymer-based layers at different temperatures, enables the manufacturing process to be further simplified, by depositing the same mixture for both the lining layer and the overlay layer.

Further, by avoiding the inclusion of a metallic alloy lining layer, one or more of the plastic polymer-based layers of the sliding bearing may be cured at higher temperatures than in sliding bearings having a metallic alloy lining layer, e.g. by replacing a prior aluminium-tin based alloy lining layer that is only able to withstand polymer curing at a low temperature.

Figure 2:
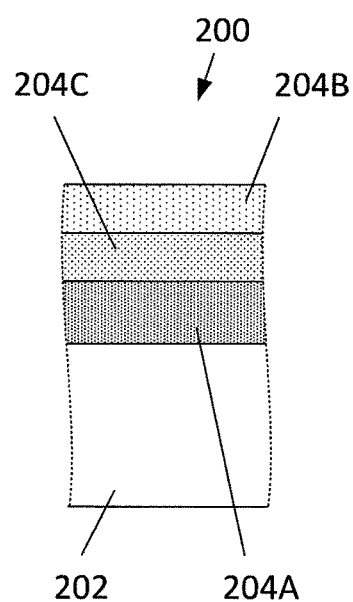
FIGS. 2 and 3 show cross-sectional views through parts of further bearing shells.

As shown in FIG. 2, a further plastic polymer-based layer 204C may be provided between the lining layer 204A and overlay layer 204B, which are cured at a temperature T3 intermediate the temperatures T1 and T2 at which the lining and overlay layers are cured (i.e. T1>T3>T2), prior to deposition of the overlay layer. Such a sliding bearing provides a more gradual monotonic graduation in mechanical performance of the polymer-based layers 204A, 204C and 204B, in which the intermediary plastic polymer-based layer(s) has intermediary physical properties. Alternatively, more than one further plastic polymer-based layers may be provided between the lining layer and overlay layer (not shown), with each successive layer being cured at a lower temperature than the previous layer.

Figure 3:
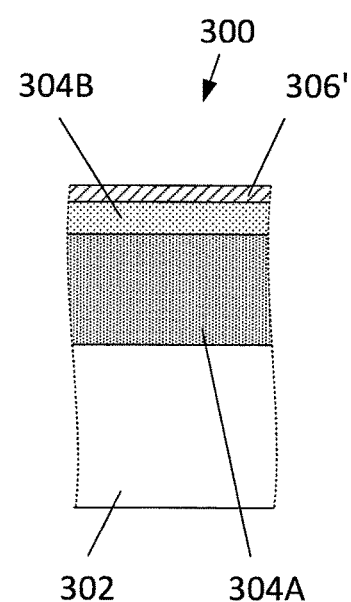

As shown in FIG. 3, an plastic polymer-based running-in layer 306' may additionally be provided on the surface of the overlay layer 304B, which is subjected to a short, low temperature cure, and which has a low hardness (and so wear resistance), compared with the overlay layer 304B. Such a running-in layer 306' provides enhanced conformability (selective wear to adapt the bearing shell to better fit to the corresponding shaft journal, in use), and is worn away relatively rapidly in use (i.e. a sacrificial layer).

The plastic polymer matrix material is selected from the group consisting of: polyamide/imide resin, acrylate resin, epoxy resin, polyurethane, fluoropolymer, polyetheretherketone, formaldehyde resin, and phenolic resin.

Suitable solvents may be non-polar (e.g. xylene, toluene), polar aprotic (e.g. acetone, n-ethyl-2-pyrrolidone {NEP}, n-methyl-2-pyrrolidone {NMP}, gamma-butyrolactone, dipropylene glycol dimethyl ether) or polar protic (e.g. water, alcohol, glycol). The solvent can be employed in various proportions in order to achieve a particular desired viscosity of mixture for coating onto the substrate.

The plastic polymer mixture may also contain an addition of a silane material. Silane materials have been found to promote stability of the polyamide/imide matrix and have also been found to promote adhesion of the polyamide/imide resin material to the substrate. A suitable silane material may be gamma-aminopropyltriethoxysilane (e.g. 3-aminopropyltriethoxysilane), and an addition in the range of 3 to 6% vol may be made to the mixture. A suitable alternative silane material may comprise bis-(gamma-trimethoxysilpropyl)amine.

The plastic polymer-based layer may further comprise from 1 to 15% vol of a dry lubricant particulate, and a preferred range of 2 to 8% vol.

A dry lubricant particulate may be included in the plastic polymer-based layer for its beneficial effect on material frictional properties and its self-lubricating effect. The dry lubricant particulate may be fluoropolymer, $Mo_2S$, or graphene. The fluoropolymer particulate addition may preferably be constituted by polytetrafluoroethylene (PTFE), as this is the most effective of the fluoropolymers in terms of reducing the friction coefficient and improving the self-lubricating properties of the plastic polymer-based layer. However, other suitable fluoropolymers, such as fluorinated ethylene-propylene (FEP), may be used if desired.

Below 1% vol of the dry lubricant particulate, the improvement in wear resistance and tribological properties is not significant. Above 15% vol of the dry lubricant particulate, the structural integrity of the plastic polymer-based layer may be compromised. Too high a content of dry lubricant particulate reduces the matrix hardness and strength by an unacceptable degree.

Particle size of the dry lubricant particulate desirably lies in the range from 1 to 5 μm, and a size range of 2 to 4 μm is preferred.

The plastic polymer-based layer may further comprise from 1% vol to less than 15% vol of a metal powder. Advantageously, the metal powder (particularly in the form of metallic flakes) enhances the thermal conductivity of the plastic polymer-based layer. The metal powder may further enhance the wear resistance of the plastic polymer-based layer. Below 1% vol of the metal powder, the improvement in wear resistance and tribological properties are not significant. Above 15% vol of the metal powder, the structural integrity of the plastic polymer-based layer may be compromised. In a preferred embodiment of the plastic polymer-based layer of the present invention, the metal powder content may lie in the range from 2 to 25% vol, and more preferably from 5 to 15% vol.

The metal powder may be chosen from: aluminium, aluminium alloys, copper, copper alloys, silver, tungsten, stainless steel. We have found that pure aluminium powder on its own gives the best results. Aluminium powder having particles in the form of flake-like platelets of about 5 to 25 μm in size, and preferably 10 to 20 μm in size (along the maximal dimension), provides a particularly suitable form of metal powder addition. The flake-like nature of the powder generally results in the maximum area of metal powder being exposed to a co-operating shaft journal by virtue of the plane of the flakes orientating generally parallel to the bearing surface. The provision of flakes within the plastic polymer-based layer that are generally parallel to the bearing surface may be provided by spray deposition of the plastic polymer-based layer.

A further advantage of the platelet flake morphology of the aluminium powder is that the particles are more securely bonded to the matrix by virtue of the relatively large surface area of each individual particle, and thus resists aluminium particles becoming plucked from the matrix during engine operation.

Without wishing to be bound by any particular theory, it is believed that the alumina film formed on the surface of the aluminium flakes may provide enhanced wear resistance. It is believed that the alumina in the plastic polymer-based layer of the sliding engine component provides a very fine abrasive, which tends to polish the machining asperities on the surface of the cooperating member (e.g. shaft journal surface), rendering the shaft journal surface less abrasive to the plastic polymer-based layer, thus reducing the wear rate of the layer.

In particular, the plastic polymer-based layer may comprise a matrix of a polyamide/imide-based polymer, having distributed throughout the matrix: from 5 to less than 25% vol of a metal particulate (e.g. metal powder and/or metal flakes); from 1 to 20% vol of a fluoropolymer, the balance being the polyamide/imide resin apart from incidental impurities. Further, the plastic polymer-based layer may comprise 12.5% vol Al, 5.7% vol PTFE particulate, 4.8% vol silane, <0.1% vol other components, and balance polyamide/imide, apart from incidental impurities. The plastic polymer-based layer may comprise at least 60% vol of plastic polymer-based matrix material (proportions are specified with respect to the content of the overlay layer after the polymer has been cured).

Although illustrated in the figures in relation to a half bearing shell, the present invention equally applies to other sliding engine components, including semi-annular, annular or circular thrust washers, and bushes.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding engine component comprising: a sliding surface including a plastic polymer-based layer disposed on a metallic substrate, wherein the plastic polymer-based layer includes a plurality of plastic polymer-based layers, and wherein the plurality of plastic polymer-based layers include:
   a first coating of a first polymer-based layer deposited on the metallic substrate and cured at a first temperature;
   a second coating of a second polymer-based layer deposited onto the first polymer-based layer and cured at a second temperature;
   wherein the second temperature is lower than the first temperature; and
   wherein the plurality of polymer-based layers have the same composition.

2. A sliding engine component according to claim 1, wherein the first temperature ranges from 190 to 240° C.

3. A sliding engine component according to claim 1, wherein the second temperature ranges from 120 to 180° C.

4. A sliding engine component according to claim 1, wherein the plurality of plastic polymer-based layers includes the first and second polymer-based layers and one or more intervening polymer-based layers, and
   wherein said one or more intervening polymer-based layers is deposited onto the first polymer-based layer and cured at an intermediate temperature such that the plurality of plastic polymer-based layers are cured at successively decreasing temperatures after the provision of each layer and before the provision of any subsequent layer.

5. A sliding engine component according to claim 1, wherein the plurality of polymer-based layers are composite layers of a plastic polymer matrix with a particulate distributed throughout the matrix.

6. A sliding engine component according to claim 1, wherein at least one of the first polymer-based layer and the second polymer-based layer is cured by a process selected from the group including: heating in an oven, infrared radiation, and ultraviolet radiation.

7. A sliding engine component according to claim 1, wherein the metallic substrate is a component selected from one or more of the following: a bearing lining shell, a bush, a bearing surface of a crankshaft, a bearing surface of a camshaft, a bearing surface of a connecting rod, a thrust washer, a bearing surface of a bearing block, and a bearing surface of a bearing cap.

8. An engine comprising a sliding engine component including a plastic polymer-based layer on a metallic substrate, the polymer-based layer comprising:
 a first polymer-based layer deposited onto the metallic substrate and cured at a first temperature; and
 a second polymer-based layer deposited onto the first polymer-based layer and cured at a second temperature that is lower than the first temperature;
 wherein the first polymer-based layer and the second polymer-based layer have the same composition.

9. An engine according to claim 8, wherein the sliding engine component includes at least one of a bearing lining shell, a bush, a bearing surface of a crankshaft, a bearing surface of a camshaft, a bearing surface of a connecting rod, a thrust washer, a bearing surface of a bearing block, and a bearing surface of a bearing cap.

10. An engine according to claim 8, wherein at least one of the first polymer-based layer and the second polymer-based layer is a composite layer including a plastic polymer matrix and a particulate distributed throughout the matrix.

11. An engine according to claim 8, wherein the first temperature ranges from 190° C. to 240° C.

12. An engine according to claim 8, wherein the second temperature ranges from 120° C. to 180° C.

13. A method of manufacturing a sliding engine component having a sliding surface including a plastic polymer-based layer on a metallic substrate, the method comprising:
 depositing a first coating of a first polymer-based layer;
 curing the first polymer-based layer at a first temperature;
 depositing a second coating of a second polymer-based layer; and
 curing the second polymer-based layer at a second temperature that is lower than the first temperature;
 wherein the first polymer-based layer and the second polymer-based layer have the same composition.

14. A method according to claim 13, wherein the first temperature ranges from 190° C. to 240° C.

15. A method according to claim 13, wherein the second temperature ranges from 120° C. to 180° C.

16. A method according to claim 13, further comprising depositing a third coating of a third polymer-based layer and curing the third polymer-based layer at a third temperature that is lower than the second temperature so that the plurality of plastic polymer-based layers are cured at successively decreasing temperatures.

17. A method according to claim 13, wherein at least one of curing the first polymer-based layer and curing the second polymer-based layer includes a process selected from the group including: heating in an oven, infrared radiation, and ultraviolet radiation.

18. A method according to claim 13, wherein at least one of the first polymer-based layer and the second polymer-based layer is a composite layer including a plastic polymer matrix and a particulate distributed throughout the matrix.

* * * * *